United States Patent [19]

Juergens

[11] 4,182,440
[45] Jan. 8, 1980

[54] PALLET FEEDING APPARATUS

[76] Inventor: Walter Juergens, Horbacher Strasse 313, 5100 Aachen-Horbach, Fed. Rep. of Germany

[21] Appl. No.: 904,568

[22] Filed: May 10, 1978

[30] Foreign Application Priority Data

May 10, 1977 [DE] Fed. Rep. of Germany ... 7714753[U]
May 10, 1977 [DE] Fed. Rep. of Germany ....... 2720916

[51] Int. Cl.² .............................................. B65G 13/00
[52] U.S. Cl. ................................................. 193/35 A
[58] Field of Search ...................... 193/35 R, 35 A, 36, 193/37; 221/295

[56] References Cited

U.S. PATENT DOCUMENTS

| | | | |
|---|---|---|---|
| 3,532,201 | 10/1970 | McConnell | 193/35 A |
| 3,627,092 | 12/1971 | Fleischauer | 193/35 A |

FOREIGN PATENT DOCUMENTS 1148823  4/1969  United Kingdom .................. 193/35 A

*Primary Examiner*—Robert B. Reeves
*Assistant Examiner*—Gene A. Church
*Attorney, Agent, or Firm*—Lawrence E. Laubscher

[57] ABSTRACT

A pallet feeding apparatus for linearly feeding a succession of pallets toward a discharge station includes a frame, a pair of horizontal, parallel track members having a plurality of rollers rotatably connected therewith to support the pallets, and a feed mechanism associated with one of the track members, or on horizontal beams aside from the track members or in the middle between the track members. A pin and guide slot arrangement is provided to permit longitudinal displacement of a feed rod relative to the track member, and pickup levers pivotally secured to each end of the feed rod are adapted to engage the pallets. A spring biases the feed rod longitudinally in a direction away from the discharge station.

10 Claims, 4 Drawing Figures

PALLET FEEDING APPARATUS

BACKGROUND OF THE INVENTION

It is well known to store heavy pallets on continuous shelves or tracks containing rollers so that the pallets may be more easily moved in and out of the storage area. The kinetic energy $mv^2/2$ produced by the movement of a series of heavy pallets during the removal from storage necessitates that the tracks be provided with braking mechanisms or a forced drive for safety reasons. The cost of such equipment is very high, however, so that it has often been not economically feasible to provide such safety equipment.

SUMMARY OF THE INVENTION

The object of the present invention is to provide a system for storing and removing from storage heavy pallets which is economically acceptable and which nevertheless will work in a manner insuring accident prevention. The pallets are transported on roller tracks and safety and forced functioning of the apparatus are guaranteed through a pallet feed and pickup mechanism which works during the removal phase of the storage operation. The pickup mechanism is activated by the second pallet which rolls after the first one by virtue of the force of gravity or by the first pallet or other means. Once the feed mechanism is activated, it picks up each succeeding pallet and sends them toward a discharge station. The energy of the rolling pallets can be cancelled out by means of a friction brake at the discharge station.

BRIEF DESCRIPTION OF THE FIGURES

This and other objects of the invention will become apparent from a study of the following specification when viewed in the light of the accompanying drawing, in which.

DETAILED DESCRIPTION

Figure 1:
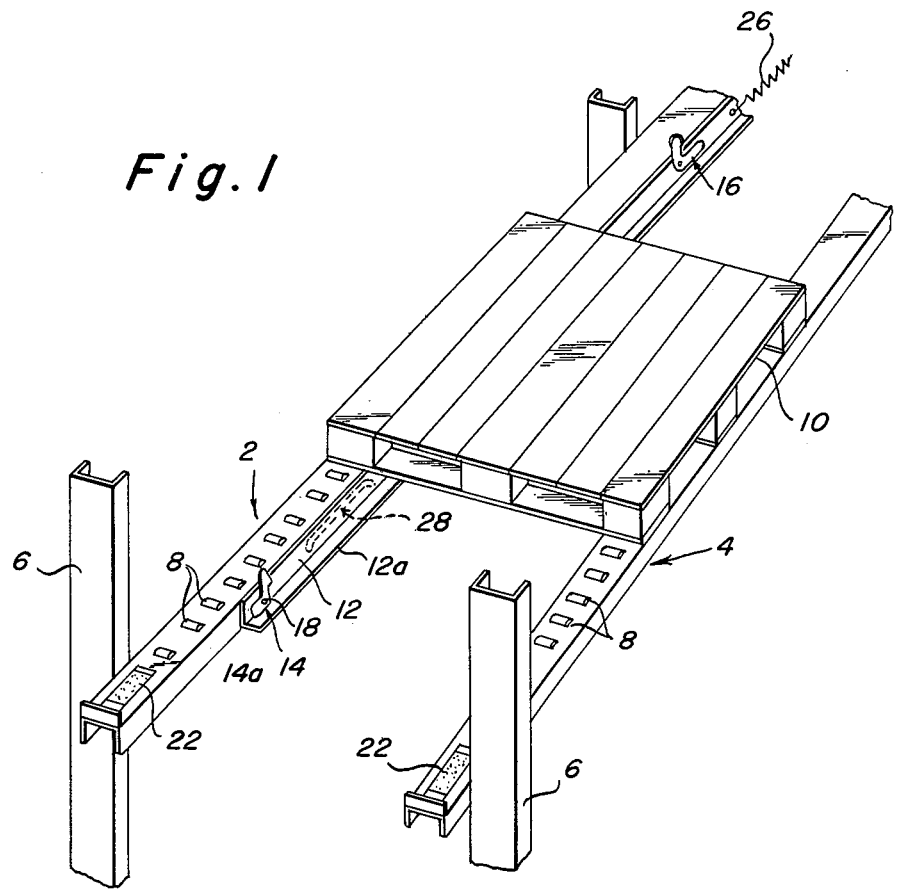
FIG. 1 is a schematic representation of the pallet feeding apparatus of the present invention.

Referring now to FIG. 1, a pair of horizontal parallel track members 2 and 4 are supported on a frame 6, the track members being contained in a common horizontal plane. A plurality of rollers 8 are rotatably connected to each track member 2 and 4, and the rollers support a pallet 10. An L-shaped feed rod 12 having a horizontal portion 12a is connected to track member 2, the length of the feed rod being greater than that of the pallet. First 14 and second 16 detent means or pickup levers are pivotally secured to the feed rod 12 at points 18 and 20, respectively. Detent means 14 has a weighted arm 14a and detent means 16 has a weighted arm 16a. Friction brakes 22 and 24 are provided at the discharge station end of tracks 2 and 4, respectively. A spring 26 biases the feed rod 12 away from the discharge station.

Figure 2:
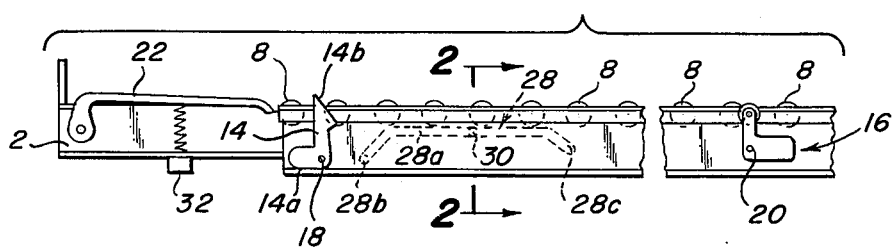
FIG. 2 is a detailed side elevational view of the left hand track member of FIG. 1.
Figure 4:
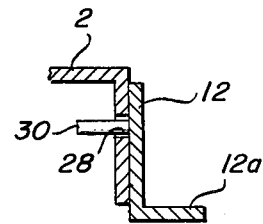
FIG. 4 is a sectional view taken along line 2—2 of FIG. 2.

As shown more clearly in FIGS. 2 and 4, a guide slot 28 is provided in track 2 having a generally horizontal portion 28a and a pair of downwardly extending end portions 28b and 28c. As illustrated in FIG. 2, end portion 28b may extend deeper than end portion 28c. A pin 30 secured to and extending from the feed rod 12 cooperates with guide slot 28 so that the feed rod moves the length of the guide slot and drops at the ends 28b and 28c.

Figure 3:
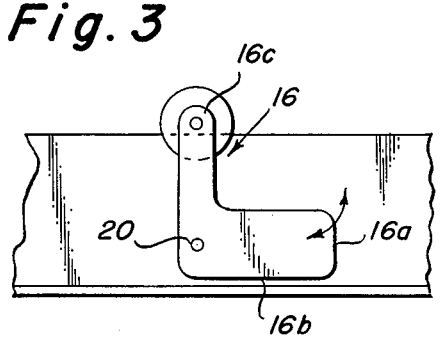
FIG. 3 is a detailed side elevational view of the second detent means of FIG. 1.

Detent means 16, as illustrated in FIG. 3, is provided with an upwardly extending arm 16c which is raised above the track 2 when the feed rod 12 is on the central portion of guide slot 28, but drops below the level of the track 2 when the feed rod 12 and pin 30 drop into the downward extending end portions 28b and 28c. Detent means 14 has an upwardly extending arm 14c which pivots down to facilitate loading of pallets onto the tracks.

Friction brakes 22 and 24 are rendered adjustable by brake tension adjusting screw means 32 (FIG. 2).

OPERATION

In operation, as the first pallet is taken out, its leading edge engages upwardly extending arm 14b of first detent member 14 and thus moves the feed rod 12 forward in accordance with guide slot 28. As a result, detent means 16 go into action to engage the trailing end of a second pallet, forcing it forward toward the discharge station. As the pin 30 moves along the guide slot 28, the feed rod 12 drops or sinks in the downwardly extending portion 28b, whereupon the detent member 14 slides under the pallet and the feed rod 12 is brought back to its starting position at 28c by spring 26 which was stressed during the forward run.

In actual use, a plurality of feed rods 12 provided with detent means 16 are spaced along the length of the track member 2, each feed rod having a pin 30 which cooperates with a correspondingly arranged guide slot.

The detent means 16 are hinged at point 20. In this way the pallets which roll down are not interfered with. During the feed phase, they are supported on the shank 12a of the feed rod 12. By virtue of the force of gravity of the weight 16a, the detent means or pickup is again and again returned to its starting position. The detent means or pickup 14 works with a weight 14a which is also supported on the angle shank 12a of the feed rod 12. As the pallets are shoved in, the detent means or pickup 14 as a result moves out of the way.

In an alternate embodiment, the tracks 2 and 4 can be supported by lateral struts. Then, of course, it is no longer an entry and continuous passage shelf but merely a continuous shelf. That, of course, in turn has the advantage that the construction can be executed more easily or the structure can be made lighter and that the feed mechanism can be placed in the middle, while in the case of the entry and continuous passage shelf, the feed mechanism must work on the sides in order to be able to run in. That is proper if there should be any breakdowns or trouble.

While in accordance with the provisions of the Patent Statutes the preferred forms and embodiments of the invention have been illustrated and described, it will be apparent to those skilled in the art that various modifications may be made without deveating from the inventive concepts set for the above.

What is claimed is:

1. Pallet feeding apparatus for linearly feeding a succession of pallets toward a discharge station, comprising
   (a) a frame;

(b) a pair of horizontal parallel track members connected with said frame, said track members being contained in a common horizontal plane;

(c) a plurality of rollers rotatably connected in longitudinally spaced relation with each of said track members, respectively, said rollers being arranged to support the pallets for successive transport along said track members;

(d) a feed rod extending parallel with and adjacent one of said track members, the length of said feed rod being greater than that of each pallet;

(e) pin and guide slot means connecting said feed rod for sliding longitudinal displacement relative to said one track member, said guide slot means including a generally horizontal central portion, and a pair of downwardly extending end portions;

(f) weighted first detent means pivotally connected with the end of said feed rod adjacent the discharge station for engagement by the leading end of a first pallet, said first detent means being gravity biased in one sense toward a normally operable position;

(g) weighted second detent means pivotally connected with the other end of said feed rod for engagement with the trailing end of a second pallet, said second detent means being gravity biased in the opposite sense toward a normally operable position; and (h) spring means biasing said feed rod longitudinally in a direction away from said discharge station, said first and second detent means and said pin and guide slot means being so arranged that when the first detent means is engaged by the forward end of the first pallet, said feed rod is initially longitudinally displaced in the direction of said discharge station toward a first end position and is subsequently displaced downwardly to release said first detent means from the forward end of the first pallet, whereupon said feed rod is displaced by said spring means in the opposite direction toward a second position in which said second detent means engages the trailing edge of a second pallet.

2. Apparatus as defined in claim 1, and further including friction brake means arranged on said track members at said discharge station.

3. Apparatus as defined in claim 2, wherein said friction brake means is adjustable.

4. Apparatus as defined in claim 1, wherein said feed rod comprises an L-shaped member and further wherein each of said first and second detent means comprises a two-arm lever, one arm of each being weighted to gravity bias said detent means toward the horizontal portion of said feed rod.

5. Apparatus as defined in claim 4, wherein said first detent means is biased toward an inoperable position as the pallets are loaded onto the track members.

6. Apparatus as defined in claim 4, wherein the unweighted arm of said second detent means is raised above said one track member when said feed rod is raised by said pin means into said generally horizontal central portion of said guide slot means, thereby to engage the trailing edge of a second pallet; and further wherein said unweighted arm is below said one track member when feed rod is lowered by said pin means into said downwardly extending end portions of said guide slot.

7. Apparatus as defined in claim 1, wherein said pin means are connected with said feed rod and said guide slot means is arranged in said one track member.

8. Apparatus as defined in claim 6, and further including (a) a plurality of said feed rods extending parallel with and adjacent the length of said one track member;

(b) a plurality of said pin and guide slot means connecting said feed rods for sliding longitudinal displacement relative to said one track member, each said guide slot means including a generally horizontal central portion, and a pair of downwardly extending end portions; and (c) second detent means pivotally connected with each said feed rod at the end of said rod remote from said discharge station.

9. Apparatus as defined in claim 8, wherein said plurality of feed rods are connected with each other for simultaneous displacement relative to said one track member.

10. Apparatus as defined in claim 1, wherein said guide slot means includes a downwardly extending end portion adjacent the discharge station which extends deeper than the other downwardly extending end portion.

* * * * *